June 7, 1927.
E. J. GRUENEWALD ET AL
1,631,809
STEERING POST CONTROL LEVER ASSEMBLY
Filed Nov. 15, 1926
2 Sheets-Sheet 1
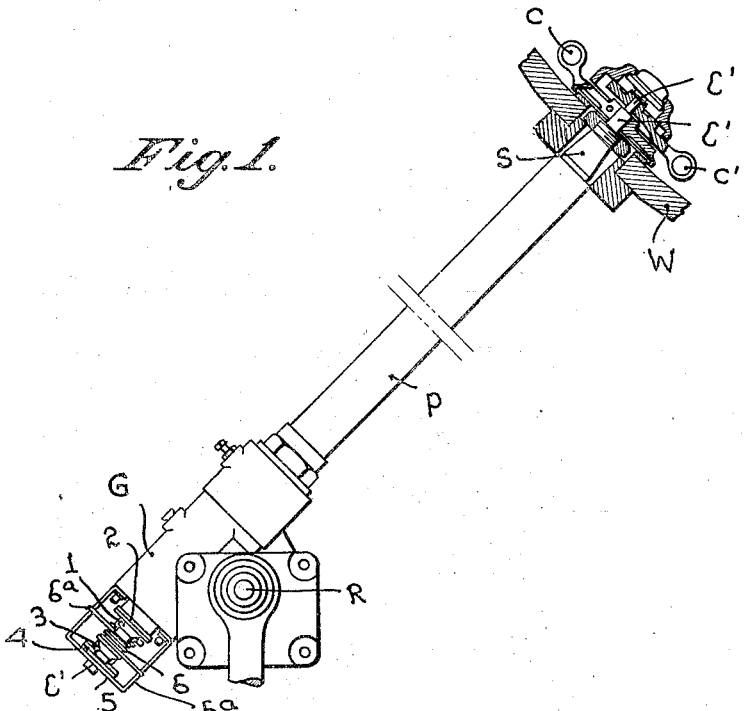
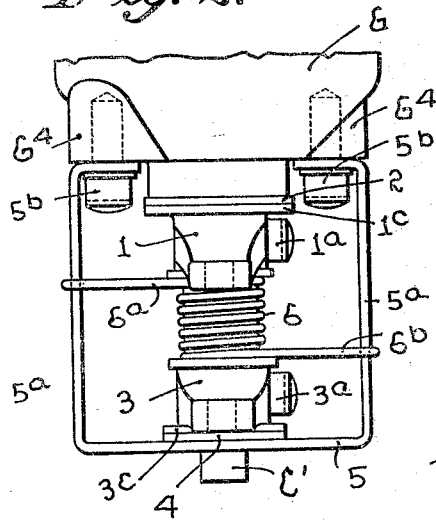
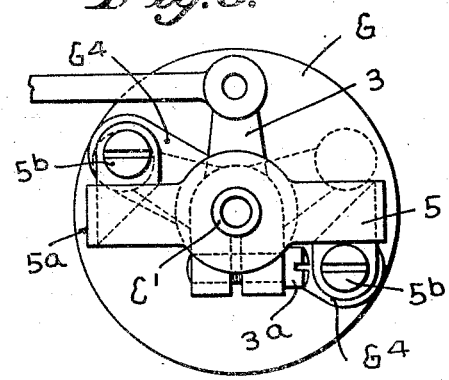
Inventor
Eugene J. Gruenewald
and David E. Ross
By Alexander Powell
Attorneys June 7, 1927.
E. J. GRUENEWALD ET AL
1,631,809
STEERING POST CONTROL LEVER ASSEMBLY
Filed Nov. 15, 1926    2 Sheets-Sheet 2
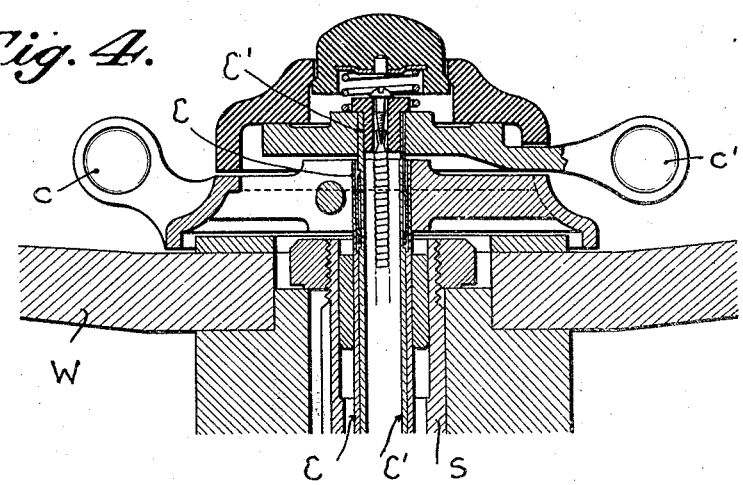
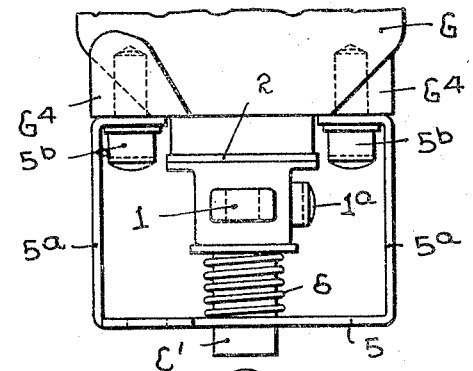
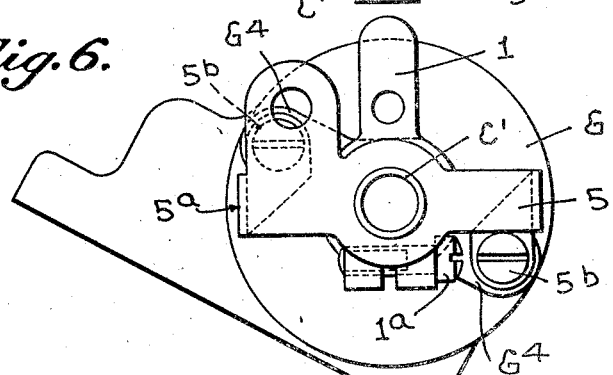
Inventor
Eugene J. Gruenewald
and David E. Ross
By
Alexander & Dowell
Attorneys.

Patented June 7, 1927.

1,631,809

UNITED STATES PATENT OFFICE.

EUGENE J. GRUENEWALD AND DAVID E. ROSS, OF LA FAYETTE, INDIANA, ASSIGNORS TO ROSS GEAR & TOOL COMPANY, OF LA FAYETTE, INDIANA, A CORPORATION OF INDIANA.

STEERING-POST CONTROL-LEVER ASSEMBLY.

Application filed November 15, 1926. Serial No. 148,554.

Our invention is a novel improvement in control assemblies for steering gears of automobiles; and its object is to provide simple and novel means for holding the various control levers mounted on the steering gear in any adjusted position and for limiting the extent of arcuate movements of said control levers.

We have illustrated one practical embodiment of the invention in the accompanying drawings and will explain the same with reference thereto to enable others to manufacture and use the same; and have summarized in the claims the essentials of the invention, and the novel features of construction, and novel combination of parts for which protection is desired.

In said drawings,—

Fig. 1 is a view partly in section of one form of steering gear equipped with our control assembly.

Fig. 2 is an enlarged side view of the control limiting devices at the lower end of the gear.

Fig. 3 is a bottom plan view of Fig. 2.

Fig. 4 is an enlarged detail sectional view through the upper end of the control assembly, illustrating one means for turning the respective spark and throttle control tubes.

Fig. 5 is an enlarged side view of limiting devices for a single control.

Fig. 6 is a bottom plan view of Fig. 5.

The invention is readily adapted to a large variety of forms of steering gears. In the drawings the controls are illustrated as applied to a cam and lever type of steering gear, such as shown in Ross Patent No. 1,567,997 of Dec. 29, 1925.

The general assembly comprises a hollow steering post P, at the lower end of which is a gear casing G housing the connections between the steering shaft S and the rocker shaft R.

The steering shaft S is arranged within post P and extends axially therethrough. The steering wheel W is fastened to the upper end of shaft S in any suitable manner. The steering shaft and means for actuating rocker shaft R are preferably constructed as in the aforesaid Ross patent, but form no part of the present invention, and may be of any other suitable construction.

Within the steering shaft S are axially arranged the nested control tubes. In the drawings we have shown in Figs. 1 to 4 a spark control tube C, and a throttle control tube C". These tubes extend through the steering shaft and the gear case G, and project below the lower end of the gear case as shown and tube C' projects below tube C. To the lower ends of these tubes below the gear case are connected novel devices for holding and limiting the movement of these tubes.

The control tubes may be turned by any suitable means. As shown a spark lever $c$ is attached to the upper end of the tube C and a throttle lever $c'$ is fixedly attached to the upper end of the tube C'. These levers $c$ $c'$ may be readily engaged by the fingers of the operator grasping the steering wheel in the usual manner.

So far the constructions described are common and may be of any suitable kind and are not features of the present invention.

Our present invention provides novel means of holding the control tubes and levers in any adjusted position and for limiting the arcuate movement of such control levers and tubes. These novel devices are illustrated most clearly in Figures 2 and 3. To the lower end of the spark control tube C which projects through and below the lower part of the gear casing G, is attached a lever 1. This lever preferably has a spit hub which may be clamped on to the lower end of the tube C by screw $1^a$. The free end of lever 1 may be connected by any suitable means to the usual spark adjusting devices (not shown). Interposed between the hub of the lever 1 and the underside of the gear case G is a washer $1^c$ which is preferably fixedly attached to the lever 1 and rotatable therewith. Interposed between the washer $1^c$ and the lower end of the gear case G is a frictional washer 2 of any suitable material. The washers $1^c$ and 2 are held in frictional engagement by a spring 6 hereinafter referred to.

The lower end of the throttle control tube C' projects below the lower end of the spark control tube C and to it is attached a lever 3, similar to the lever 1, and fastened thereto by a bolt 3ª, similar to bolt 1ª. The free end of lever 3 may be connected by any suitable means to the throttle (not shown). A frictional washer 3ᶜ is non-rotatably attached to the lower side of lever 3, and a non-rotatable friction disk 4, of any suitable material, is interposed between washer 3ᶜ and the lower member 5 of a hanger attached to the gear case G. This hanger is shown as U-shaped and the upper ends of its parallel side portions 5ª are secured by tap bolts 5ᵇ to lugs G⁴ on the lower portion of the gear case G, (as shown). This hanger when attached to the housing serves to limit the swinging movement of levers 1 and 3 and also support the washer 4 and spring 6.

Interposed between the levers 1 and 3 is a helical expansion spring 6 which tends to push the levers 1 and 3 apart, and to produce frictional pressure contact between lever 1, or washer 1ᶜ, and the friction washer 2; and between lever 3, or washer 3ᶜ, and the frictional washer 4. The spring 6 can freely expand but is kept from turning by having its ends 6ª and 6ᵇ respectively engaged with the opposite side portions 5ª of the hanger 5 (see Fig. 2).

The construction permits either control tube and lever to be turned without turning, or any tending to transmit rotatory movement to the other control tube and lever. The vertical portions of the hanger 5 form stops to limit the arcuate movements of the levers 1 and 3.

When there is only one control tube used—f. i. tube C', the spring 6 is interposed directly between the lever 1 and the lower portion of the hanger 5, as shown in Figs. 5 and 6, the hanger 5 being similar to, but shorter than, the hanger shown in Fig. 2.

Obviously the number of control tubes and levers used will vary according to the number of different controls which it is desired to have assembled at the center of the steering shaft and wheel. Any additional control tube could be easily arranged within and concentric to the others, and provided at its lower end with a lever and frictional disks similar to those illustrated in Figs. 2 and 5.

An electrical signaling device or push button may be also mounted on the assembly as indicated in Figs. 1 and 2 of the drawings but as this forms no part of the present invention no further explanation thereof is necessary.

We claim:

1. In combination with a steering post, a control tube extending through the post, means on the upper end of the control tube for turning the same; a lever attached to the lower end of the control tube; a hanger attached to the post below the tube; frictional means for holding the lever and a spring for holding said means in frictional contact, said frictional means and spring being concentric with the tube, and said hanger holding the frictional means and spring in operative position.

2. In devices as set forth in claim 1, the lower member of said hanger forming an abutment for the spring and the sides of the hanger limiting the rotatorial movement of the lever.

3. In combination with a steering post, a plurality of control tubes extending through the post, means on the upper end of each control tube for turning the same; a lever attached to the lower end of each control tube; a hanger attached to the post below the tube; frictional members and an expansion spring on the lower ends of the tubes for holding the levers in adjusted positions; said hanger supporting the frictional members and spring in operative position.

4. In combination with a steering post, a control tube extending through the post, means on the upper end of the control tube for turning the same; a lever attached to the lower end of the control tube; a hanger attached to the post below the tube; frictional members respectively attached to the lever and to a relatively fixed part; and an expansion spring strung on the lower end of the tube for holding said member in frictional contact; said hanger forming one abutment for the spring and also limiting the rotatorial movement of the lever.

5. In combination with a steering post, a plurality of control tubes extending through the post, means on the upper end of each control tube for turning the same; a lever attached to the lower end of each control tube; a hanger attached to the post below the tube, frictional members respectively attached to the levers and to a fixed part; an expansion spring strung on the lower ends of the tubes; means for holding the parts in frictional contact; said hanger supporting the springs in operative position and also limiting the rotatorial movement of the levers.

6. In combination with a steering post having a gear case at its lower end, a plurality of control tubes extending through the post and gear case, means on the upper end of each control tube for turning the same; a lever attached to the lower end of each control tube; a hanger attached to the gear case; a frictional member attached to each lever, and to the gear case; an expansion spring on the lower ends of the tube interposed between the levers, and frictional members on the gear case and hanger engaging the frictional members on the levers.

7. In mechanism as set forth in claim 6 said hanger holding the spring and frictional members in operative relation, and also limiting the rotatorial movement of the levers.

8. In combination with a steering post, a control tube extending through the post, means on the upper end of the control tube for turning the same; a lever attached to the lower end of the control tube; a U-shaped hanger attached to the post below the tube; a frictional member attached to the lever, an opposed friction member strung on the lower end of the tube; an expansion spring on the tube for holding said members in frictional contact; said hanger forming one abutment for the spring and also limiting the rotatorial movement of the lever.

9. In combination with a steering post, a plurality of control tubes extending through the post, means on the upper end of each control tube for turning the same; a lever attached to the lower end of each control tube; a U-shaped hanger attached to the post below the tube; frictional members attached to the levers; relatively fixed opposed friction members strung on the tubes; an expansion spring strung on the tubes for holding the opposed frictional members in contact; said hanger supporting the springs in operative position and also limiting the rotatorial movement of the lever.

10. In combination with a steering post having a gear case at the lower end, a plurality of control tubes extending through the post and gear case, means on the upper end of each control tube for turning the same; a lever attached to the lower end of each control tube; a hanger attached to the gear case; a frictional member attached to each lever, and to the gear case; an expansion spring on the lower ends of the tube interposed between the levers and having its opposite ends engaged with opposite legs of the hangers; frictional members on the gear case and hanger engaging the frictional members on the levers; said hanger holding the spring and frictional members in operative relation and also limiting the rotatorial movement of the lever.

In testimony that we claim the foregoing as our own we affix our signatures.

EUGENE J. GRUENEWALD.
DAVID E. ROSS.